Patented Sept. 22, 1931

1,824,100

UNITED STATES PATENT OFFICE

MAX SCHLÖTTER, OF BERLIN, GERMANY

PROCESS FOR ELECTROLYTIC DEPOSIT OF HEAVY METALS

No Drawing. Application filed January 16, 1929, Serial No. 332,764, and in Germany November 9, 1928.

My invention relates to processes for electrolytic deposition of heavy metals by use of metal salts with various anions as electrolytes.

In my book "Galvanostegie" I page 31, I have previously pointed out that the kind or type of the metal deposit is considerably influenced by the anion which is used in the electrolyte. From the researches by Kohlenschuetter ("Ueber elektrolytische Kristallisationsvorgaenge" Z,f. Elch. 1927 page 274) I have deduced (Korrosion & Metallschutz, 1928 page 74 and following) that the kind of the metal salts dissolved in the electrolyte will determine the direction of the crystalline growth of the metal precipitation.

It is known that every metal deposited electrolytically absorbs hydrogen during its precipitation and that only the quantities of the absorbed hydrogen vary, and it is further certain that the hydrogen, partly chemically bound partly mechanically enclosed, is existent in the deposited metal. In accordance with the kind of bond of the hydrogen and with the quantity of the absorbed hydrogen the crystalline structure of the precipitation varies and the latter shows then varying physical characteristics as, for instance, with reference to the intensity of its adherence, its capacity to cover the ground metal, the scattering of the precipitation, the more or less dense condition etc. With reference to the absorbtion of hydrogen in electrolytically deposited metal, I have pointed out that the hydrogen dissolved in the deposited metal cannot originate from the decomposition of water, but is derived from the cation as in accordance with Werner's theory the molecule of the water in the cation is rather firmly bound with the metal nucleus and the decomposition of this cation proceeds differently from that of the true decomposition of water.

It could therefore be expected that from the same metal salts always the same kind of metal deposit could be obtained which would be variable within narrow limits through current density, temperature and concentration, but, as a whole, the crystalline growth of metals deposited from the same metal salt cannot change fundamentally. Only with the change of the metal salt itself, viz: of the anion, a material change of the character of the metal crystal takes place. If one takes one of the not easily soluble metal salts it can be observed that from these salts in the electrolysis the metal is easily deposited in the form of macro-crystalline, which grow out in the solution crystalline or fork thread-like shapes if the crystallization is disturbed by the addition of colloids or of substances of capillary activity.

I have discovered that one can influence fundamentally the crystalline character of the deposited metal if one takes metal salt solutions which contain various anions. The metal crystals deposited from the different metal salts influence themselves and precipitations can be obtained, the building up of which, has a character entirely different from that of the precipitation obtained in each separate metal salt solution. The deposited metal does not grow beyond its base and even at the edges there are more crystals, but the edges merely round themselves off so that a more ball-like formation is obtained at the rims.

As an example for such a solution I am citing, for instance for lead, the following electrolyte:

200 grams benzoldisulfonic acid of lead.
100 grams perchlorate of lead.
1 liter water.

or:

220 grams napthalintetrasulfonic acid of lead.
200 grams silico fluoride of lead.
1 liter water.

To such solutions colloids like glue, pyriden higher alcohols, or substances of capillary activity can advantageously be added and a bath of the following composition can be used.

220 grams benzoldisulfonic acid of tin.
100 grams stannous sulfate.
5 grams gelatine.
10 grams benzoldisulfonic acid.
5 grams tannin.
1 liter water.

I wish it distinctly understood that in the formulæ given above the proportions of the mix may be varied as desirable without departing from the spirit of my invention and I desire the following claims to cover such modifications as naturally fall within the lines of invention.

Claims:

1. Process for electrolytic deposit of metals of the lead group which consists in the use of metal salts in which the metal to be deposited is partly bound to an organic and partly to an inorganic anion.

2. Process for the electrolytic deposit of metals of the lead group as claim 1 consisting in adding to the electrolyte colloids like glue, gelatine, licorice root, etc.

3. Process for the electrolytic metal deposit of metals of the lead group in accordance with claim 1 consisting in adding to the electrolyte substances of capillary activity as tannic acid, pyridin, higher alcohols, etc.

4. Process for electrolytic metal deposit of metals of the lead group according to claim 1 consisting in adding to the electrolyte colloids and substances of capillary activity.

5. Process for electrolytic deposit of metals of the tin group which consists in the use of metal salts in which the metal to be deposited is partly bound to an organic and partly to an inorganic anion.

6. Process for the electrolytic deposit of metals of the tin group as claim 5 consisting in adding to the electrolyte colloids like glue, gelatine, licorice root, etc.

7. Process for the electrolytic metal deposit of metals of the tin group in accordance with claim 5 consisting in adding to the electrolyte substances of capillary activity as tannic acid, pyridin, higher alcohols, etc.

8. Process for electrolytic metal deposit of metals of the tin group according to claim 5 consisting in adding to the electrolyte colloids and substances of capillary activity.

Dated this 22 day of March 1930.

MAX SCHLÖTTER.